Oct. 13, 1970     D. W. GRANT     3,533,767
METHOD FOR PRODUCING TUBULAR GLASS STRUCTURES
Filed July 24, 1967
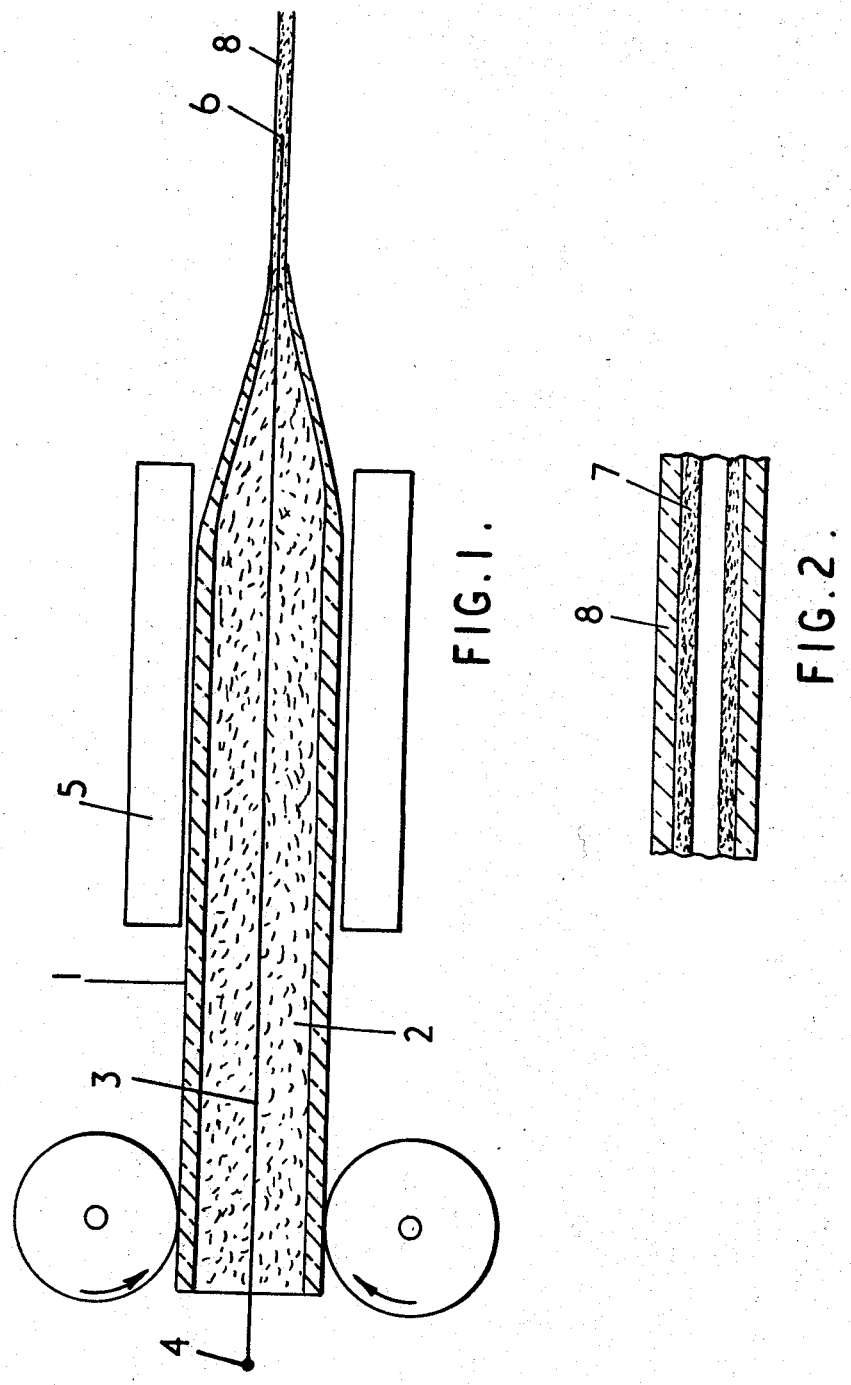

United States Patent Office 3,533,767
Patented Oct. 13, 1970

3,533,767
METHOD FOR PRODUCING TUBULAR
GLASS STRUCTURES
David Walter Grant, Gomersal, near Leeds, England, assignor to The Coal Tar Research Association, Gomersal, near Leeds, England, a corporation of Great Britain
Filed July 24, 1967, Ser. No. 655,498
Claims priority, application Great Britain, July 26, 1966, 33,472/66
Int. Cl. C03b 23/20, 37/02
U.S. Cl. 65—2                    8 Claims

ABSTRACT OF THE DISCLOSURE

A lined capillary tube suitable for example for chromatography is made by pulling out the heated tube, packed with lining material, over a wire core which is subsequently removed.

---

This invention relates to the fabrication of glass tubing the inner wall of which is lined with a particulate coating material. In particular, the invention relates to the production of narrow bore glass tubes suitable for use in gas chromatographic analysis, the internal wall of which has a lining of particulate absorbent material such as diatomaceous earth.

It is already well known to use narrow bore (capillary) columns of metal or glass for gas chromatographic analysis, the inner wall being coated with a liquid stationary phase. In order to obtain a uniform coating of suitable thickness of this stationary phase, it has already been proposed to pre-coat the inner wall of the capillary with a suitable support. One such support is the prepared diatomaceous earth known as Celite. To establish the coating, the support material has in the past been made up as a suspension, with which the inner wall of the capillary is wetted. This however leaves a rather thin layer on the inner wall.

The invention consists, broadly, in a method of making a glass tube having a lining of particulate material on its inner wall, which comprises drawing out a thermally softened glass tube packed with the particulate material in a region where a central, axially fixed core is located, the particulate material being one which will form a coherent lining under these conditions.

A suitable core is formed by a length of tungsten or other high melting metallic wire. This may be placed inside a glass tube of suitable diameter, which is then packed with particulate material such as Celite. The tube is then drawn out as in making a capillary tube, the wire being anchored so that it does not move with the drawn-out tubing. As a result, the resulting capillary tube with the lining formed with an inner bore corresponding to the diameter of the wire, is pulled off the wire as it is made. The result is a tubing, generally a capillary tubing, lined with a relatively thick particulate layer.

For gas chromatography purposes, the capillary tube may have an internal diameter of about .006 to .008". The precise diameter is not very critical, and a sufficient uniformity may be attained by predetermining the bore and wall thickness of the original glass tubing, the mode and rate of heating, and the rate of feeding and drawing the tubing. The thickness of the filler can also vary within wide limits.

The invention will be described further with reference to the accompanying drawings, of which:

FIG. 1 is a schematic longitudinal sectional view of a glass tube being drawn out in a suitable apparatus, and FIG. 2 is a sectional view on a larger scale of the finished capillary tube.

Referring to FIG. 1, a starting glass tube 1 is packed with a suitable inert absorbent material 2 such as Celite, alumina or brick dust. A tungsten wire 3 anchored at 4 is located generally in the tube before the filler is packed in. Next, the tube is fed through an annular heater 5 which softens it sufficiently to enable it to be drawn out to a capillary. The necessary pull is applied by a further pair of rollers (not shown) at a region where the resulting capillary is sufficiently cooled. The tungsten core extends to the point 6 which is sufficiently far beyond the heater 5 for the glass to be no longer plastic. The effect of this wire is to press the particulate absorbent material against the walls of the resulting capillary, leaving a central bore for the passage of liquid or gas. The resulting lining 7 on the inner face of the wall 8 of the capillary is shown on a bigger scale in FIG. 2.

The particulate material will normally incorporate a binding agent in a quantity sufficient to make the particles thereto adhere together but insufficient to form with the particles an impenetrable mass. The binding agent may be one which liquifies on heating, or it may be one which is already liquid but sets rapidly on heating.

It will be understood that the expression "glass" is used widely to embrace any suitable glass-like material, including silica.

The lining may be formed from any refractory material depending on the purpose for which it is to be used. For gas-solid chromatography one would use an adsorbent material such as alumina, silica gel, activated carbon or a molecular sieve. For gas-liquid chromatography the lining would consist of a non-adsorptive but highly porous solid such as diatomaceous earth. The optimum particle diameter is one-half times the total internal diameter of the tube minus the diameter of the core. Between 5 and 20% of a binding agent is necessary, this being added to the lining material before packing the tube. The binding agent is a non-adsorptive material having a melting point lower than that of the tube material so that it can flow at the temperature of the drawing furnace to act as an adhesive. Suitable binding agents are halides (simple or mixed) of alkaline metals particularly lithium chloride, potassium bromide, sodium iodide. Columns produced by this method for gas chromatography may have total internal diameters of between .01 and .02" and for each diameter a range of core sizes possible viz .005" to .015" diameter depending on the size of the tube. The wire used for forming the bore is conveniently tungsten but other metals could be used such as stainless steel, platinum or platinum-rhodium.

I claim:
1. A method of producing a glass tube lined with particulate material comprising the steps of providing particulate material in a cavity formed by a glass tube and a central axially fixed core, said particulate material being a refractory material; heating the particulate material filled tube to soften said glass tube; drawing the softened glass tube and particulate material relative to said core to reduce the outer diameter of said glass tube thereby compacting said particulate material against said core to form a coherent particulate material lining in the drawn glass tube; and removing said core after said glass tube has sufficiently cooled.

2. A method according to claim 1 wherein said fixed core is a length of metallic wire.

3. A method according to claim 2 wherein the composition of said metallic wire is selected from a group consisting essentially of tungsten, stainless steel, platinum or platinum-rhodium.

4. A method according to claim 1 wherein the particulate material lined glass tube is a capillary tube, and said removing step occurs by virtue of the fact that said core is axially fixed and extends linearly beyond the point where the heating occurs a sufficient distance so that the drawn glass tube and compacted particulate material have cooled below their plastic point and are structurally stable before they are drawn beyond the end of said core.

5. A method according to claim 1, in which said glass tube is drawn to have an internal diameter of .006 to .008".

6. A method according to claim 1, in which said particulate material is an inert absorbent material selected from a group consisting essentially of diatomaceous earth, alumina, brick dust, silica gel or activated carbon.

7. A method according to claim 1, in which said particulate material incorporates a binding agent in a quantity sufficient to make the particles thereof adhere together but insufficient to form with the particles an impenetrable mass.

8. A method according to claim 7 wherein said particulate material is diatomaceous earth and from 5 to 20% of binding agent selected from a group consisting essentially of lithium chloride, potassium bromide or sodium iodide.

References Cited
UNITED STATES PATENTS

| | | | |
|---|---|---|---|
| 2,613,479 | 10/1952 | Stong | 65—277 X |
| 3,362,803 | 1/1968 | Dannöhl | 65—3 X |

FOREIGN PATENTS

| | | |
|---|---|---|
| 598,898 | 4/1933 | Germany. |

S. LEON BASHORE, Primary Examiner

R. L. LINDSAY, JR., Assistant Examiner

U.S. Cl. X.R.

65—13, 18, 86; 117—129; 161—176